(12) United States Patent
Lee (10) Patent No.: US 12,251,781 B2
(45) Date of Patent: Mar. 18, 2025

(54) TOOL HOLDER WITH STRAIGHT SPRAY OF COOLING WATER FOR MACHINE TOOL

(71) Applicant: TOPTOOLING SYSTEMS, Changwon-si (KR)

(72) Inventor: Sung Geun Lee, Gimhae-si (KR)

(73) Assignee: Da Hyun Lee, Daegu (KR)

( * ) Notice: Subject to any disclaimer, the term of this patent is extended or adjusted under 35 U.S.C. 154(b) by 500 days.

(21) Appl. No.: 17/610,456

(22) PCT Filed: May 13, 2020

(86) PCT No.: PCT/KR2020/006302
§ 371 (c)(1),
(2) Date: Nov. 11, 2021

(87) PCT Pub. No.: WO2020/231183
PCT Pub. Date: Nov. 19, 2020

(65) Prior Publication Data
US 2022/0226952 A1  Jul. 21, 2022

(30) Foreign Application Priority Data
May 15, 2019  (KR) ........................ 10-2019-0056668

(51) Int. Cl.
*B23Q 11/10* (2006.01)

(52) U.S. Cl.
CPC .......... *B23Q 11/1023* (2013.01); *B23Q 11/10* (2013.01); *B23B 2231/24* (2013.01); *B23Q 2220/008* (2013.01); *B23Q 2230/002* (2013.01)

(58) Field of Classification Search
CPC ............ B23Q 2220/008; B23Q 11/103; B23Q 11/1023; B23Q 11/10; B23Q 11/1084;
(Continued)

(56) References Cited

U.S. PATENT DOCUMENTS 4,213,354 A * 7/1980 Dahinden .......... B23Q 11/1015
82/900
4,557,643 A * 12/1985 Cioci .................... F16L 27/087
279/20
(Continued)

FOREIGN PATENT DOCUMENTS

CN     108526966 A     9/2018
JP     H08183296 A  *  7/1996
(Continued)

OTHER PUBLICATIONS

International Search Report for PCT/KR2020/006302 mailed Aug. 10, 2020 from Korean Intellectual Property Office.

*Primary Examiner* — Ryan Rufo
(74) *Attorney, Agent, or Firm* — Revolution IP, PLLC (57) ABSTRACT

A Tool Holder with Straight Spray of Cooling Water for Machine Tool includes: a body that provides a mounting space in which the tool is mounted, and is linked to the rotational motion of the machine tool; a housing unit that covers the outer surface of the body; a cap nozzle unit that is disposed to surround the outer circumferential surface of the tool while being connected to the lower side of the housing unit; an adapter unit that is mounted on the machine tool, providing a passage for cooling water supplied from the cooling water supply unit, and determining a mounting position of the body to the machine tool; and a side rod unit that connects the adapter unit and the housing unit while being connected to the side of the housing unit, and moves the cooling water supplied from the adapter unit to the cap nozzle unit.

11 Claims, 12 Drawing Sheets

(58) Field of Classification Search
CPC ....... B23B 2231/24; Y10T 409/304032; Y10T 409/309408; B23C 2250/12
See application file for complete search history.

(56) References Cited

U.S. PATENT DOCUMENTS

| | | | | |
|---|---|---|---|---|
| 4,981,403 | A * | 1/1991 | Katayama | B23Q 5/048 409/137 |
| 5,358,360 | A * | 10/1994 | Mai | B23Q 11/1084 279/20 |
| 7,134,812 | B2 * | 11/2006 | Beckington | B23Q 1/0036 279/20 |
| 7,582,004 | B2 * | 9/2009 | Schwartz | B24B 55/03 451/449 |
| 7,785,046 | B2 * | 8/2010 | Beckington | B23Q 11/1023 279/20 |
| 8,678,724 | B2 * | 3/2014 | Lee | B23Q 11/10 279/20 |
| 9,138,847 | B2 * | 9/2015 | Yeh | B23Q 11/1015 |
| 9,956,621 | B2 * | 5/2018 | Haimer | B23B 31/1179 |
| 9,981,356 | B2 | 5/2018 | Sailing | |
| 2016/0184903 | A1 * | 6/2016 | Chen | B23B 31/2012 279/20 |

FOREIGN PATENT DOCUMENTS

| | | | | |
|---|---|---|---|---|
| JP | 2005034964 | A * | 2/2005 | |
| JP | 2014-188639 | A | 10/2014 | |
| JP | 02-048171 | Y2 | 12/2019 | |
| KR | 10-1394532 | B1 | 5/2014 | |
| KR | 10-2019-0046464 | A | 5/2019 | |
| WO | WO-2015152453 | A1 * | 10/2015 | ......... B23Q 11/1023 |

* cited by examiner

TOOL HOLDER WITH STRAIGHT SPRAY OF COOLING WATER FOR MACHINE TOOL

TECHNICAL FIELD

The present invention relates to a Tool Holder with Straight Spray of Cooling Water for Machine Tool, and more specifically to a tool holder that connects a tool to a machine tool and, when machining a workpiece, sprays cooling water, supplied from the cooling water supply unit, between the tool and the workpiece.

BACKGROUND ART

In the machine tool cutting and processing industry, the efficiency of cooling water spray is the biggest challenge. Although it greatly affects the working environment and productivity, efficiency and environmental problems (mist generation) have not been solved until now.

In addition, since the lifespan of a cutting tool determines the quality, productivity, delivery time and price of processed products, the demand for technologies and systems that improve the lifespan and performance of cutting tools may continue to increase in industries such as automobiles, aerospace, and medical, where cutting tools are used a lot.

Specifically, the purchase cost of the cutting tool itself accounts for 3 to 8% of the total cost of the machined parts, and if the performance of the cutting tool is not good, the machining time becomes longer, resulting in an increase in labor costs, power charges, maintenance cost of machining equipment, and consumables costs. As a result, the cost may rise again.

If the increase in cooling water spray efficiency improves the performance of the cutting tool and, in turn, increases machining speed by 20%, processing time is shortened, resulting in a 15% reduction in production cost, and dimensional precision is improved compared to the existing tool, greatly reducing the post-processing to ensure precision.

Conventionally, in the milling process, the external nozzle on the side sprays cooling water to the machining point, but due to limitations in spray efficiency, cutting heat, and interference from chips and workpieces, it is difficult for cooling water to directly reach the face of cutting tool where actual cutting takes place. However, as the most efficient internal supply method, spraying with a tool holder has been developed by several foreign companies, but cooling water scatters when the spindle rotates, limiting the cooling and lubrication action, which is the biggest role of cooling water, and generating a large amount of mist to deteriorate the working environment.

Therefore, it is necessary to develop a system capable of always spraying cooling water where the cutting takes place even if the shape of the tool is changed by forming a pipe inside the tool holder and spraying cooling water over the entire area at 360 degrees right above the cutter.

Korea Registered Patent No. 10-1394532

SUMMARY OF INVENTION

Technical Problem

The present invention aims to provide a Tool Holder with Straight Spray of Cooling Water for Machine Tool with the ability to convert centrifugal force into centripetal force to minimize the spread of cooling water and to efficiently and directly spray cooling water to the nearest part of the tool.

Solution to Problem

The Tool Holder with Straight Spray of Cooling Water for Machine Tool according to an embodiment of the present invention for connecting a tool to the machine tool and spraying cooling water, supplied from a cooling water supply unit, between the tool and the workpiece comprises: a body that provides a mounting space in which the tool is mounted, and is linked to the rotational motion of the machine tool while being connected to the machine tool; a housing unit that covers the outer surface of the body; a cap nozzle unit that is disposed to surround the outer circumferential surface of the tool while being connected to the lower side of the housing unit, and configured to spray the cooling water between the tool and the workpiece; an adapter unit that is mounted on the machine tool, providing a passage for cooling water supplied from the cooling water supply unit, and determining a mounting position of the body to the machine tool; and a side rod unit that connects the adapter unit and the housing unit while being connected to the side of the housing unit, and moves the cooling water supplied from the adapter unit to the cap nozzle unit, wherein the cap nozzle unit forms a retention space between the housing unit and itself for cooling water to stay, and is provided with a plurality of drain holes in a direction parallel to the external exposure direction of the tool, and the cooling water in the retention space is discharged through the plurality of drain holes while rotating in the same direction as the tool by receiving rotational force from the rotating tool in the retention space, and secures straightness toward the end of the tool by the centripetal force formed in the retention space.

The side rod unit of the Tool Holder with Straight Spray of Cooling Water for Machine Tool according to an embodiment of the present invention may be detachably connected to the adapter unit.

The side rod unit of the Tool Holder with Straight Spray of Cooling Water for Machine Tool according to an embodiment of the present invention may be disconnected from the body when seated on the adapter unit and connected to the body when removed from the adapter unit, and the coupling between the body and the housing unit may be determined through the side rod unit.

The body of the Tool Holder with Straight Spray of Cooling Water for Machine Tool according to an embodiment of the present invention is dependent on the housing unit when connected to the side rod unit, and released from the housing unit to be rotatable around the housing unit when disconnected from the side rod unit.

The side rod unit of the Tool Holder with Straight Spray of Cooling Water for Machine Tool according to an embodiment of the present invention may comprises: a receiving unit that forms a first receiving space formed in the height direction and a second receiving space that is linked to the first receiving space, perpendicular to the height direction, and formed in a first width direction toward the housing unit; a connection unit that slides along the receiving unit while being retained in the first receiving space and is detachably connected to the adapter unit; an elastic unit that is received in the first receiving space, located on the lower side of the connection unit, and elastically deformed by the external force applied in the height direction of the connection unit; and a subordinate unit that is linked to the position movement in the height direction of the connection unit while being received in the second receiving space and moves in the first width direction.

The connection unit of the Tool Holder with Straight Spray of Cooling Water for Machine Tool according to an embodiment of the present invention moves from the first position to the lower side along the first receiving space to be located in the second position when connected to the adapter unit, and returns from the second position to the first position when disconnected from the adapter unit; and the elastic unit is compressed and elastically deformed as the connection unit moves from the first position to the second position, and when the connection unit is disconnected from the adapter unit, returns the connection unit from the second position to the first position by a restoring force due to the compressive elastic deformation.

The subordinate unit of the Tool Holder with Straight Spray of Cooling Water for Machine Tool according to an embodiment of the present invention may have a through hole formed in the height direction, and the connection unit may be moved in the height direction along the through hole while being inserted into the through hole.

In the Tool Holder with Straight Spray of Cooling Water for Machine Tool according to an embodiment of the present invention, the connection unit has a guide hole penetrating in a second width direction that is perpendicular to the first width direction; the guide hole is formed with a constant width, but inclined upward to be away from the housing unit from the lower side to the upper side; the subordinate unit is inserted into a side hole formed on a side surface defining the through hole and has a sliding unit extending in the second width direction; and the sliding part may be inserted into the guide hole to slide along the guide hole as the connection unit moves in the height direction.

In the Tool Holder with Straight Spray of Cooling Water for Machine Tool according to an embodiment of the present invention, the housing unit is recessed from a surface opposite to the side rod unit, and has a recessed hole linked to the second receiving space; the recessed hole is linked with the coupling groove of the body; the subordinate unit moves in a direction away from the body while being inserted into the recessed hole to be spaced apart from the coupling groove as the connection unit moves from the first position to the second position, and moves toward the body to be coupled with the coupling groove as the connection unit moves from the second position to the first position; the body becomes dependent on the housing unit when the subordinate unit is coupled with the coupling groove, and can be released from the housing unit when the subordinate unit is spaced apart from the coupling groove.

In the Tool Holder with Straight Spray of Cooling Water for Machine Tool according to an embodiment of the present invention, the receiving unit has a second flow path formed to be penetrated; the connection unit is formed to be penetrated and, when connected to the adapter unit, has a first flow path providing a passage through which the cooling water supplied from the adapter unit moves; the first flow path is not linked with the second flow path at the first position of the connection unit, but linked with the second flow path at the second position of the connection unit; the second flow path is linked with a third flow path between the housing unit and the body part; and the third flow path is linked to the retention space.

In the Tool Holder with Straight Spray of Cooling Water for Machine Tool according to an embodiment of the present invention, the third flow path may comprise a 3-1 flow path and a 3-2 flow path branching from the first flow path and a 3-3 flow path that allows the cooling water to rotate and move through a helical part formed in a helical shape inside the lower inner side of the housing unit, wherein the 3-3 flow path may be linked to the retention space.

In the Tool Holder with Straight Spray of Cooling Water for Machine Tool according to an embodiment of the present invention, the housing unit has a male thread formed on the outer side of the lower portion; and the cap nozzle unit has a female thread formed in a shape corresponding to the male thread so that it can be coupled or uncoupled with the housing unit.

In the Tool Holder with Straight Spray of Cooling Water for Machine Tool according to an embodiment of the present invention, the cap nozzle unit includes a tool insertion hole through which the tool passes and a plurality of drain holes radially arranged around the tool insertion hole; and the plurality of drain holes are formed to be inclined toward a rotation axis of the tool so that the cooling water retained in the retention space can be sprayed toward the rotation axis of the tool.

In the Tool Holder with Straight Spray of Cooling Water for Machine Tool according to an embodiment of the present invention, the plurality of drain holes includes a first hole arranged unit disposed at a first distance from the tool insertion hole and a second hole arranged unit disposed at a second distance greater than the first distance from the tool insertion hole, wherein the slope of the second hole arranged unit may be greater than the slope of the first hole arranged unit.

In the Tool Holder with Straight Spray of Cooling Water for Machine Tool according to an embodiment of the present invention, the cooling water sprayed through the second hole arranged unit can minimize scattering of the cooling water sprayed through the first hole arranged unit due to the repulsive force caused by the rotational force of the tool.

In the Tool Holder with Straight Spray of Cooling Water for Machine Tool according to an embodiment of the present invention, each drain hole constituting the first hole arranged unit may have a different slope, and each drain hole constituting the second hole arranged unit may have a different slope.

Beneficial Effects

According to the present invention, by controlling the spreading phenomenon of the cooling water, it is possible to maximize the cooling water spray efficiency, thereby remarkably increasing the processing productivity and the working environment.

In addition, by effectively lowering the cutting heat generated during cutting, it is possible to extend the tool lifespan and improve the machining speed and precision.

In addition, by increasing the cooling water spray efficiency, it is possible to improve the performance of the cutting tool and increase the processing speed, thereby reducing the processing time and the production cost and improving dimensional precision compared to existing tools, resulting in significant reduction in post-processing to ensure precision.

In addition, the lifespan of the cutting tool is increased and the tool replacement time is shortened, thereby reducing the production cost and securing the productivity competitiveness of the processing and manufacturing industry.

BEST MODE FOR CARRYING OUT THE INVENTION

Hereinafter, specific embodiments of the present invention will be described in detail with reference to the drawings. However, the spirit of the present invention is not limited to the presented embodiments, and those skilled in the art who understand the spirit of the present invention can easily suggest other degenerative inventions or other embodiments included within the scope of the present invention by adding, changing, or deleting other elements within the scope of the same spirit, but this will also be included within the scope of the present invention.

In addition, components having the same function within the scope of the same idea shown in the drawings of each embodiment will be described using the same reference numerals.

Figure 1:
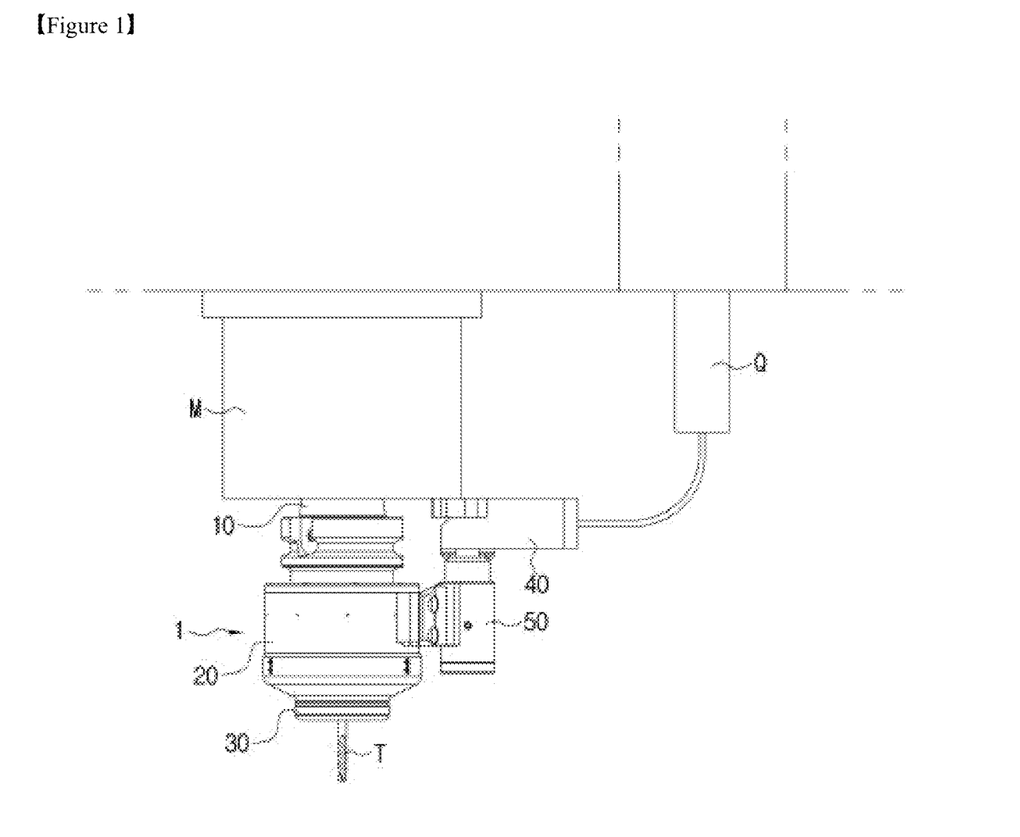
FIGS. 1 and 2 are schematic perspective diagram showing a machine tool equipped with a Tool Holder with Straight Spray of Cooling Water for Machine Tool according to an embodiment of the present invention.
Figure 2:
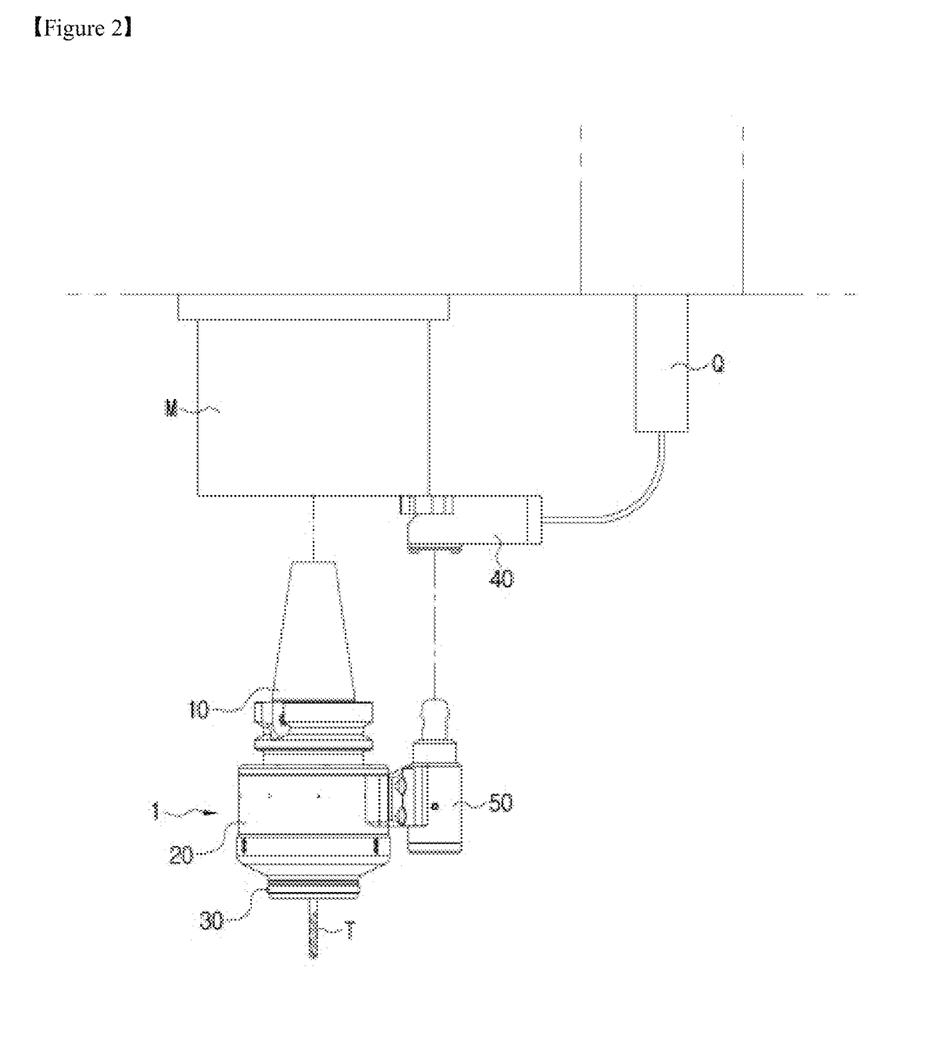
Figure 3:
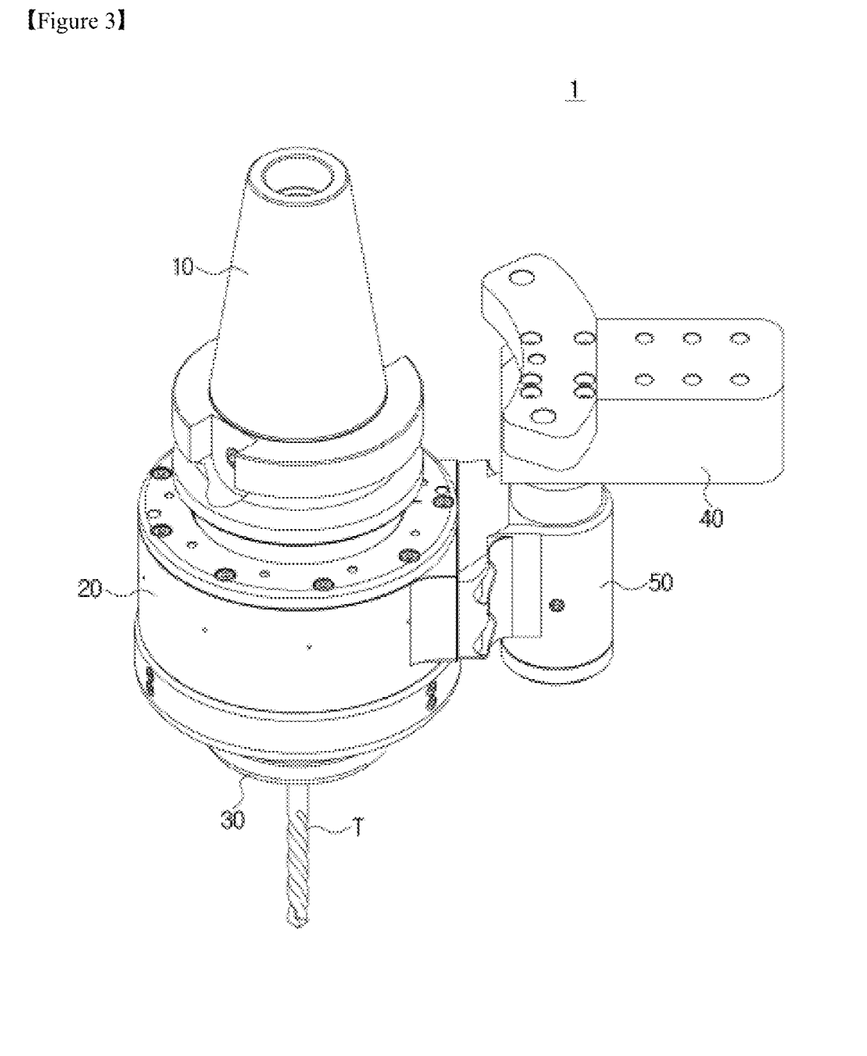
FIG. 3 is a schematic perspective view showing a Tool Holder with Straight Spray of Cooling Water for Machine Tool according to an embodiment of the present invention.
Figure 4:
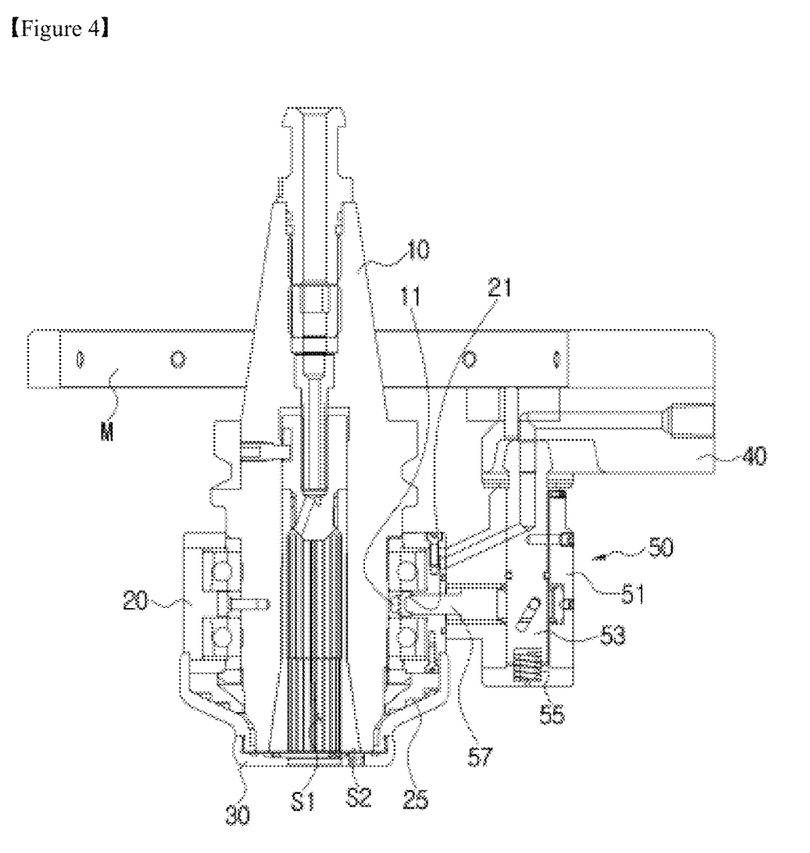
FIG. 4 is a schematic cross-sectional view showing a Tool Holder with Straight Spray of Cooling Water for Machine Tool according to an embodiment of the present invention.

FIG. 1 and FIG. 2 are schematic perspective views showing a machine tool equipped with a Tool Holder with Straight Spray of Cooling Water for Machine Tool according to an embodiment of the present invention, FIG. 3 is a schematic perspective view showing a Tool Holder with Straight Spray of Cooling Water for Machine Tool according to an embodiment of the present invention, and FIG. 4 is a schematic cross-sectional view showing a Tool Holder with Straight Spray of Cooling Water for Machine Tool according to an embodiment of the present invention.

Referring to FIGS. 1 to 4, according to an embodiment of the present invention, the tool holder of the machine tool spindle (M) (1, hereinafter "tool holder") connects the machine tool spindle (M) and the cutting tool (T) and sprays the cooling water supplied from a cooling water supply unit (Q) between the Tool Holder with Straight Spray of Cooling Water for Machine Tool and the workpiece during processing of the workpiece.

The tool holder 1 according to the present invention may include a body (10), a housing unit (20), a cap nozzle unit (30), an adapter unit (40), and a side rod unit (50).

The body (10) may provide a mounting space (51) in which the cutting tool (T) is mounted, and be linked to the rotational motion of the machine tool spindle (M) while being connected to the machine tool spindle (M).

The housing unit (20) may cover the outer surface of the body (10).

The body (10) may provide a mounting space (51) in which the cutting tool (T) is mounted, and be linked to the rotational motion of the machine tool spindle (M) while being connected to the machine tool spindle (M).

In addition, the cap nozzle unit (30) forms a retention space (S2) in which cooling water stays in between the housing unit (20), and may be provided with a plurality of drain holes (H) in a direction parallel to the exposure of the cutting tool (T).

Figure 8:
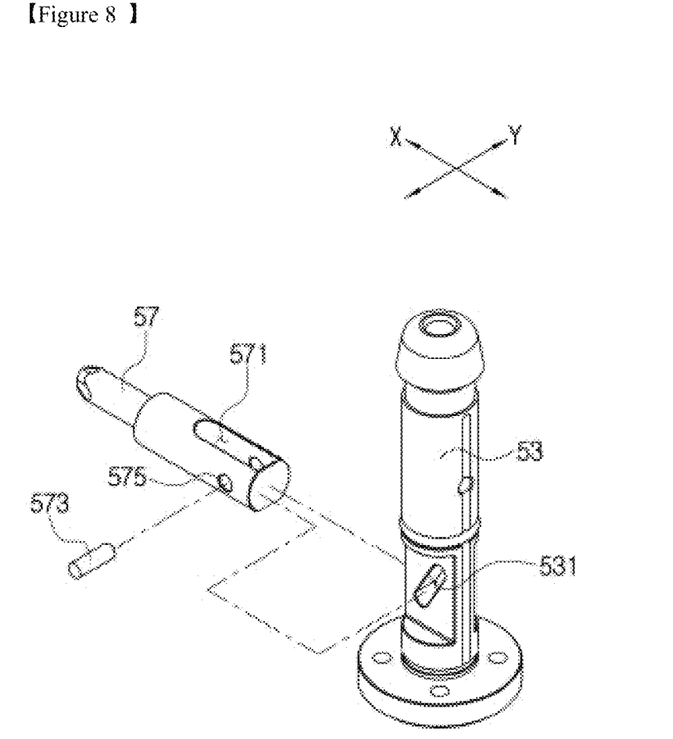

The cooling water retained in the retention space (S2) receives a rotational force by the rotation of the cutting tool (T) within the retention space (S2, see FIG. 3 and FIG. 8), thereby rotating around the cutting tool (T) in the same direction as the cutting tool (T).

In addition, the cooling water retained in the retention space (S2) is discharged through the plurality of drain holes (H, see FIG. 10), while securing straightness toward the end of the cutting tool (T) by the centripetal force formed in the retention space (S2).

The adapter unit (40) is mounted on the machine tool spindle (M), provides a passage for cooling water supplied from the cooling water supply unit (Q), and can determine the body (10) mounting position on the machine tool spindle (M).

Specifically, the body (10) may be mounted on the machine tool spindle (M) while being arranged in a specific direction, and according to the mounting of the side load unit (50) to the adapter unit (40), the body (10) may be disposed in a particular orientation at a mounting position on the machine tool spindle (M).

The side rod unit (50) connects the adapter unit (40) and the housing unit (20) while being connected to the side of the housing unit (20), and can move the cooling water supplied from the adapter unit (40) to the cap nozzle unit (30).

Hereinafter, with reference to FIG. 5 to FIG. 12, each component constituting the tool holder (1) of the present invention and the relationship between the components will be described in detail.

FIGS. 5 to 8 are schematic diagrams for explaining the side rod unit of a Tool Holder with Straight Spray of Cooling Water for Machine Tool according to an embodiment of the present invention.

Referring to FIGS. 5 to 8, the side rod unit (50) of the tool holder (1) according to an embodiment of the present invention may be detachably connected to the adapter unit (40).

Specifically, when the side rod unit (50) is seated on the adapter unit (40) (see FIG. 5), it is disconnected from the body (10), and when it is removed from the adapter unit (40) (See FIG. 6), it is connected to the body (10).

The body (10) may or may not be coupled with the housing unit (20) via the side rod unit (50).

Specifically, when the body (10) is connected to the side rod unit (50), it becomes dependent on the housing unit (20), and when disconnected from the side rod unit (50), it is released from the housing unit 20) to be rotatable around the housing unit (20).

The side rod unit (50) may include a receiving unit (51), a connection unit (53), an elastic unit (55) and a subordinate unit (57).

The receiving unit (51) is linked to the first receiving space (V1, see FIG. 7) formed in the height direction (Z, see FIG. 7), and forms a second receiving space (V2, see FIG. 7) formed in a first width direction (X, see FIG. 7) that is perpendicular to the height direction (Z) and faces the housing unit (20).

Figure 7:
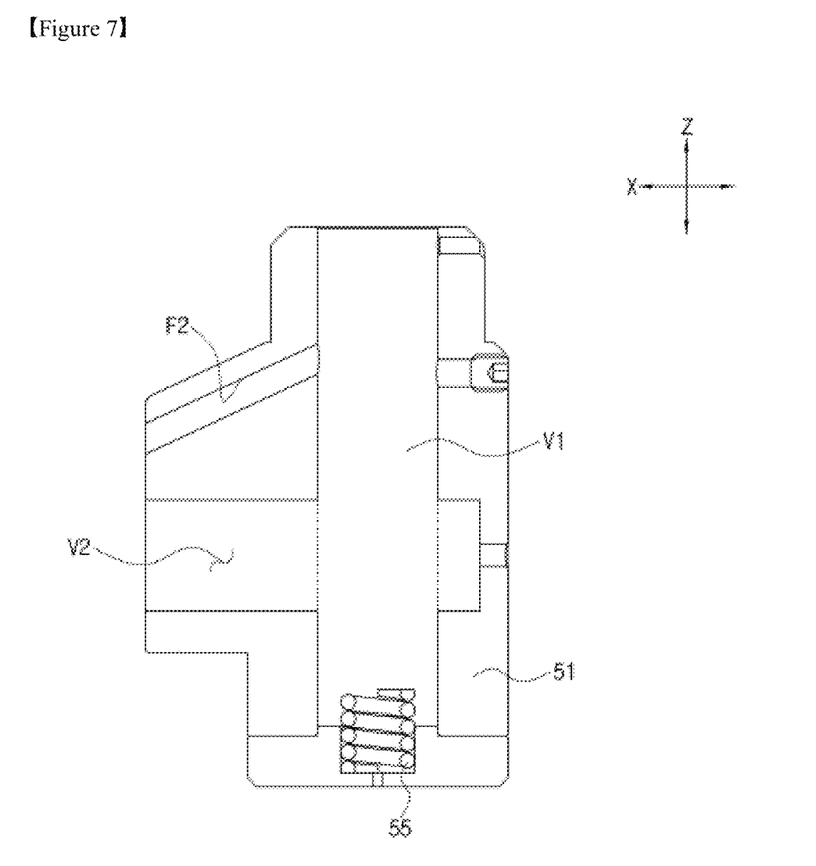

The connection unit (53) slides along the receiving unit (51) while being received in the first receiving space (V1), and may be detachably connected to the adapter unit (40).

The elastic unit (55) is received in the first receiving space (V1), located on the lower side of the connection unit (53), and may be elastically deformed by an external force applied in the height direction (Z) of the connection unit (53).

The subordinate unit (57), while being received in the second receiving space (V2), is interlocked with the positional movement of the connection unit (53) in the height direction (Z) and may move in the first width direction (X).

The connection unit (53), when connected to the adapter unit (40), moves from the first position (see FIG. 5) to the lower side along the first receiving space (V1) and is located in the second position (see FIG. 6) and, when disconnected from the adapter unit (40), returns from the second position to the first position.

Figure 5:
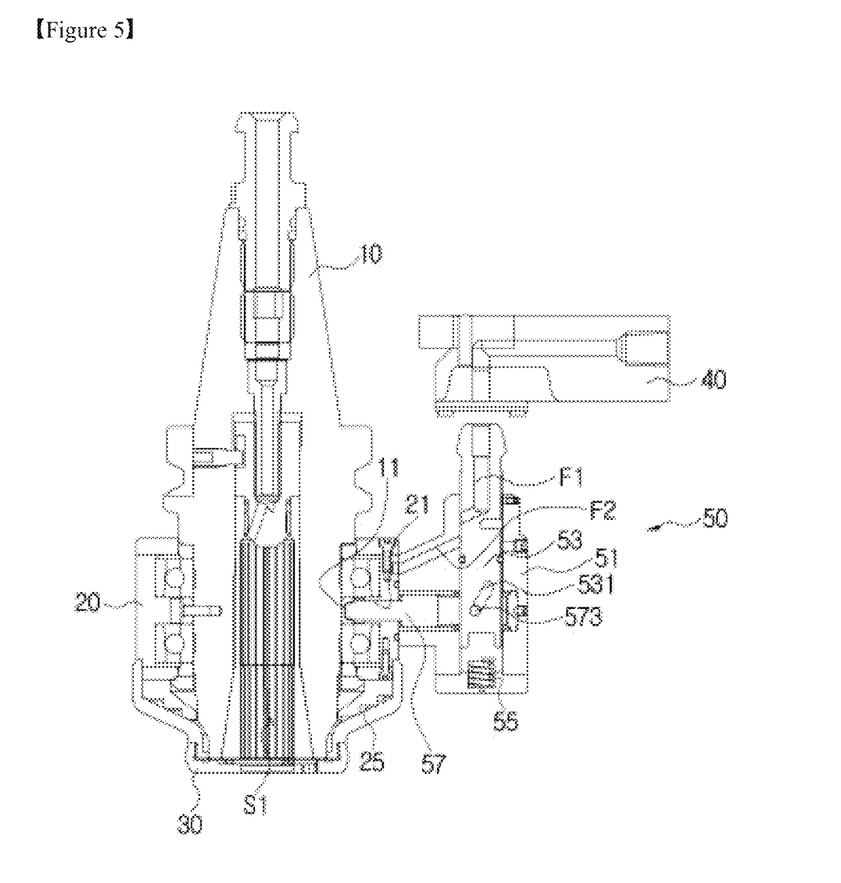
FIGS. 5 to 8 are schematic views for explaining the side rod unit of a Tool Holder with Straight Spray of Cooling Water for Machine Tool according to an embodiment of the present invention.
Figure 6:
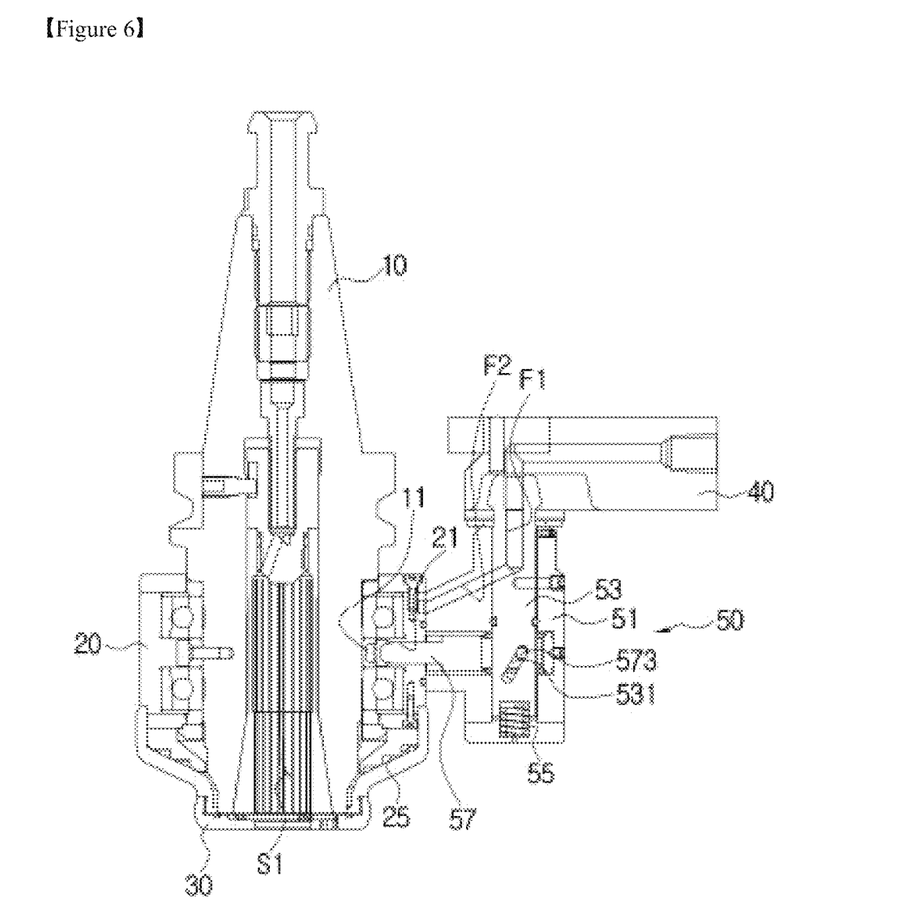

The elastic unit (55) is compressed and elastically deformed as the connection unit (53) moves from the first position to the second position and, when the connection unit (53) is disconnected from the adapter unit (40), may return the connection unit (53) from the second position to the first position by the restoring force due to the compressive elastic deformation.

The subordinate unit (57) may include a through hole (571) formed to penetrate in the height direction (Z).

The connection unit (53) may move in the height direction (Z) along the through hole (571) while being inserted into the through hole (571).

In addition, the connection unit (53) may include a guide hole (531) penetrating in the second width direction (Y) perpendicular to the first width direction (X).

The guide hole (531) may be formed to have a constant width, and be inclined upward in a direction to be away from the housing unit (20) from the lower side to the upper side.

The subordinate unit (57) may include a sliding unit (573) that is inserted into a side hole (575) formed on a side surface defining the through hole (571) and extends in the second width direction (Y).

The sliding unit (573) may slide along the guide hole (531) while being inserted into the guide hole (531) as the connection unit (53) moves in the height direction (Z).

On the other hand, the housing unit (20) is recessed from the opposite surface facing the side rod unit (50), and may be provided with a recessed hole (21) linked to the second receiving space (V2).

The recessed hole (21) may be linked with the coupling groove (11) of the body (10). The subordinate unit (57) may be moved away from the body (10) while being inserted into the recessed hole (21) to be spaced apart from the coupling groove (11) as the connection unit (53) moves from the first position to the second position.

Specifically, when the connection unit (53) descends to move from the first position to the second position, the sliding unit (573) moves in a direction to be away from the body (10) along the guide hole (531). Accordingly, the subordinate unit (57) may also be moved in a direction away from the body (10) to be spaced apart from the coupling groove (11).

In addition, the subordinate unit (57) may be moved toward the body (10) to be coupled with the coupling groove (11) as the connection unit (53) moves from the second position to the first position.

Specifically, when the connection unit (53) rises for position movement from the second position to the first position, the sliding unit (573) moves toward the body (10) along the guide hole (531), and accordingly, the subordinate unit (57) may also move toward the body (10) to be in contact/coupled with the coupling groove (11).

When the subordinate unit (57) is coupled to the coupling groove (11), the body (10) may become dependent on the housing unit (20).

Here, being dependent means that the body (10) and the housing unit (20) are engaged so that the body (10) cannot rotate independently of the housing unit (20).

And, when the subordinate unit (57) is spaced apart from the coupling groove (11), the body (10) may be released from the housing unit (20).

Here, being released means that the body (10) and the housing unit (20) are not engaged so that the body (10) can rotate independently of the housing unit (20).

Figure 9:
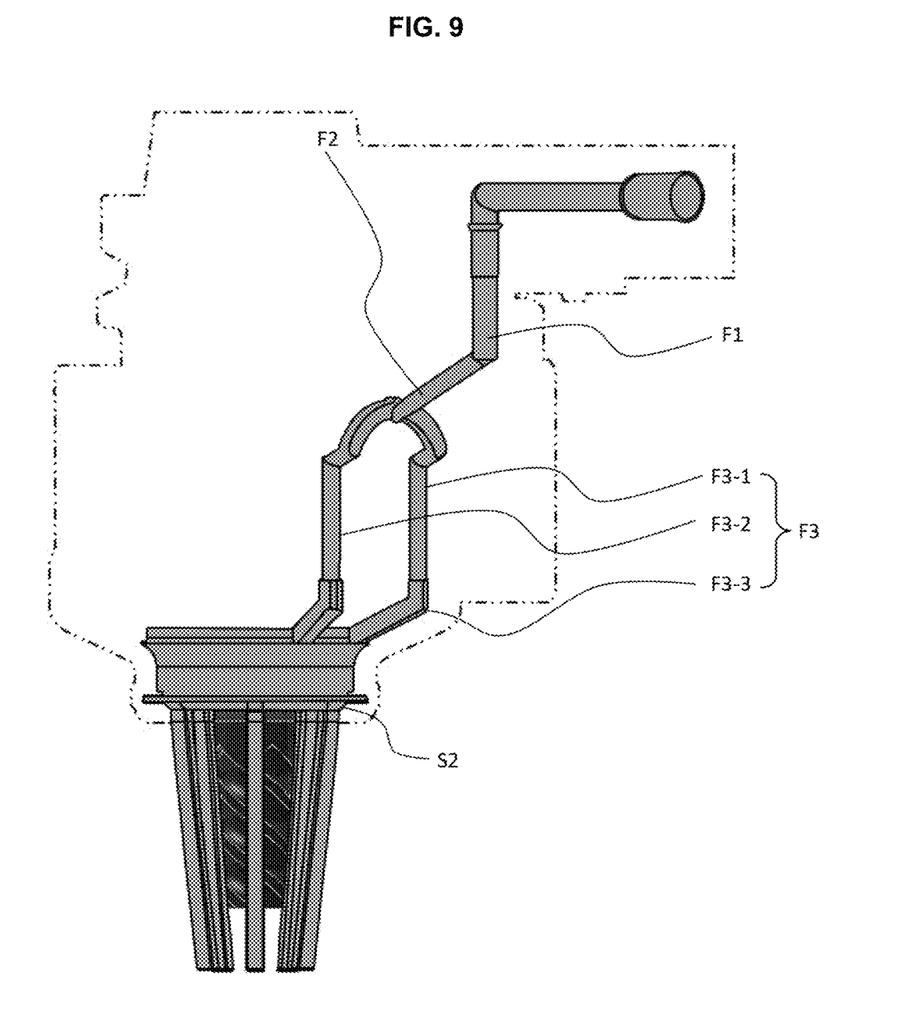
FIG. 9 is a schematic view for explaining the cooling water movement path of the Tool Holder with Straight Spray of Cooling Water for Machine Tool according to an embodiment of the present invention.

FIG. 9 is a schematic diagram for explaining the cooling water movement path of the Tool Holder with Straight Spray of Cooling Water for Machine Tool according to an embodiment of the present invention.

Referring to FIG. 9, the connection unit (53) of the tool holder (1) according to an embodiment of the present invention is formed to be penetrated and, when connected to the adapter unit (40), may have a first flow path (F1, see FIG. 5 and FIG. 9) that provides a passage for the cooling water supplied from the adapter unit (40) to move.

In addition, the receiving unit (51) may be provided with a second flow path (F2, see FIG. 5 and FIG. 9) formed to be penetrated.

The adapter unit (40) may have a supply flow path through which the cooling water supplied from the cooling water supply unit (Q) moves.

The first flow path (F1) is not linked to the second flow path (F2) at the first position of the connection unit (53), but can be linked to the second flow path (F2) at the second position of the connection unit (53).

Accordingly, when the connection unit (53) is not connected to the adapter unit (40), the cooling water introduced through the first flow path (F1) does not flow into the second flow path (F2), and when the connection unit (53) is connected to the adapter unit (40), the cooling water introduced through the first flow path (F1) may flow into the second flow path (F2).

The second flow path (F2) may be linked with a third flow path (F3) between the housing unit (20) and the body (10).

The third flow path (F3) may be linked to the retention space (S2).

Specifically, the third flow path (F3) may include a 3-1 flow path (F3-1) and a 3-2 flow path (F3-2) branching from the first flow path (F1) as well as a 3-3 flow path (F3-3) that allows the cooling water to rotate and move through a helical unit (25, see FIG. 5) formed in a helical shape inside the lower part of the housing unit (20).

The 3-1 flow path (F3-1) and the 3-2 flow path (F3-2) may be branched into two to optimize the space of the side rod unit (50) and to bypass the position of the subordinate unit (57).

The 3-3 flow path (F3-3) may be linked to the retention space (S2).

Accordingly, the cooling water supplied from the cooling water supply unit (Q) may be introduced into the retention space (S2) through the supply flow path of the adapter unit (40), the first flow path (F1), the second flow path (F2) and the third flow path (F3).

Figure 10:
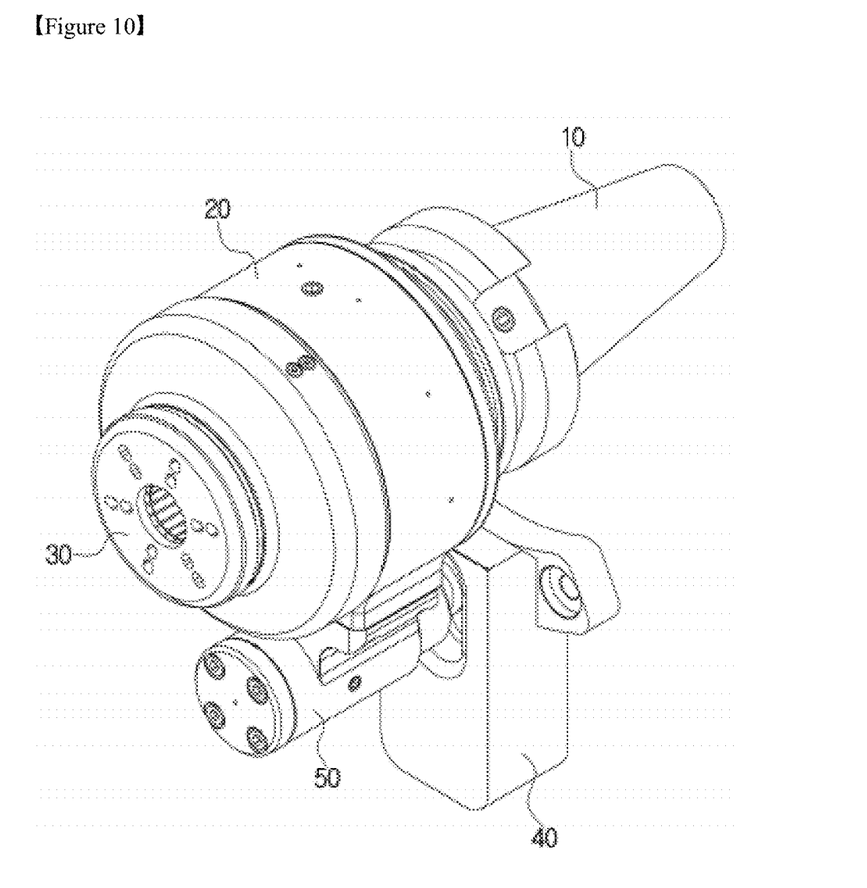
FIGS. 10 to 12 are schematic views for explaining the cap nozzle unit of the Tool Holder with Straight Spray of Cooling Water for Machine Tool according to an embodiment of the present invention.
Figure 11:
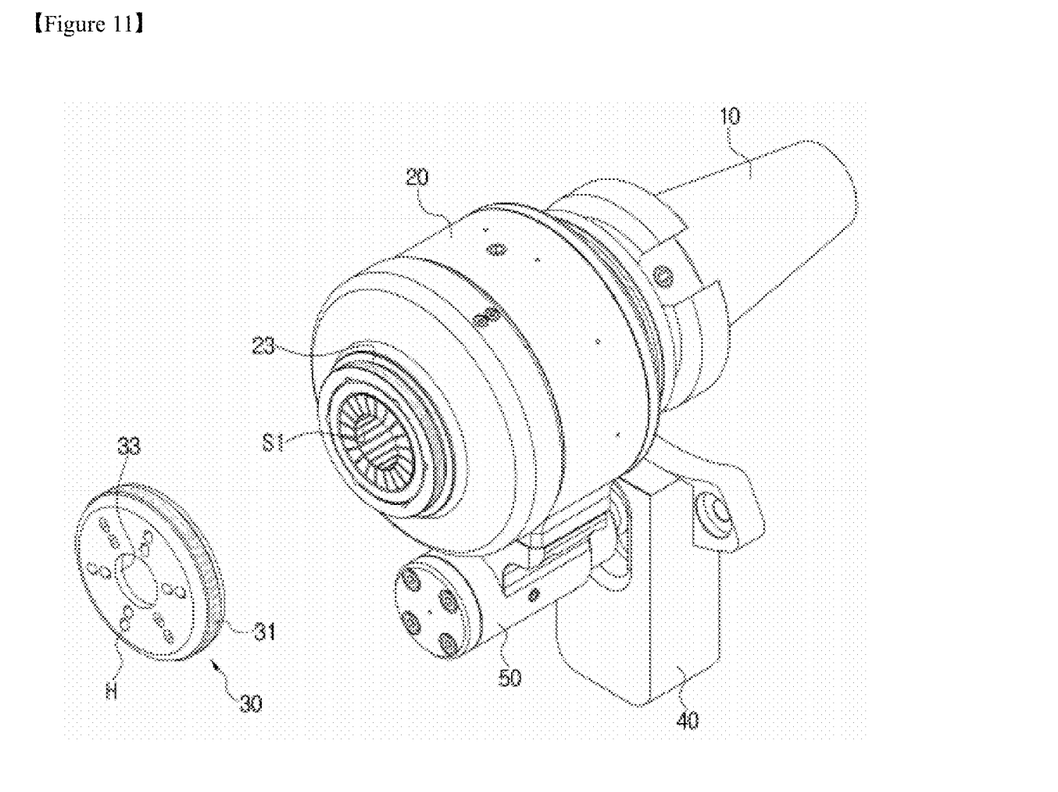
Figure 12:
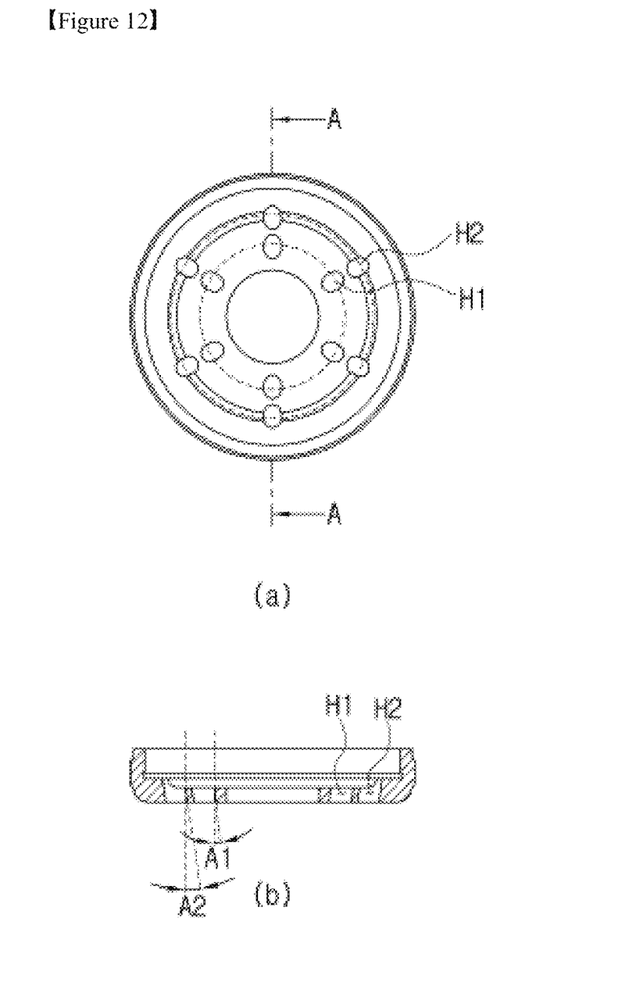

FIGS. 10 to 12 are schematic views for explaining the cap nozzle unit of the Tool Holder with Straight Spray of Cooling Water for Machine Tool according to an embodiment of the present invention.

FIG. 12 (*b*) is a cross-sectional view of AA in FIG. 12 (*a*).

Referring to FIG. 10 to FIG. 12, the housing unit (20) of the tool holder (1) according to an embodiment of the present invention may form a male thread (23) on the lower outer side.

The cap nozzle unit (30) may include a female thread (31) formed in a shape corresponding to the male thread (23), and may be detachably attached to the housing unit (20) through thread coupling.

In addition, the cap nozzle unit (30) may include a tool insertion hole (33) through which the cutting tool (T) passes and a plurality of drain holes (H) radially disposed around the tool insertion hole (33).

The plurality of drain holes (H) are formed to be inclined toward the rotation axis of the cutting tool (T) so that the cooling water retained in the retention space (S2) is sprayed toward the rotation axis of the cutting tool (T).

In addition, the plurality of drain holes (H) may include a first hole arranged unit (H1) disposed at a first distance from the tool insertion hole (33) and a second hole arranged unit (H2) disposed at a second distance greater than the first distance from the tool insertion hole (33).

The slope (A2) of the second hole arranged unit (H2) may be greater than the slope (A1) of the first hole arranged unit (H1).

Specifically, the slope of the first hole arranged unit (H1) may be smaller than the slope of the second hole arranged unit (H2). Accordingly, the imaginary first extension line extending the slope of the first hole arranged unit (H1) and the imaginary second extension line extending the slope of the second hole arranged unit (H2) may face a contact point between the cutting tool (T) and the workpiece.

In addition, the cooling water sprayed through the second hole arranged unit (H2) minimizes scattering of the cooling water sprayed through the first hole arrangement unit (H1) due to the repulsive force caused by the rotational force of the cutting tool (T).

Specifically, the cooling water sprayed through the second hole arranged unit (H2) prevents the cooling water sprayed through the first hole arranged unit (H1) from scattering outward of the cutting tool (T), thereby improving the straightness of the cooling water.

Each drain hole constituting the first hole arranged unit (H1) may have a different slope, and each drain hole constituting the second hole arranged unit (H2) may have a different slope.

In the above, the configuration and features of the present invention have been described based on the embodiments of the present invention, but the present invention is not limited thereto, and various changes or modifications within the spirit and scope of the present invention will be apparent to those skilled in the art to which the present invention pertains, and therefore such changes or modifications fall within the scope of the appended claims.

1: Tool Holder with Straight Spray of Cooling Water for Machine Tool
T: cutting tool
M: machine tool spindle
10: body
20: housing unit
30: cap nozzle unit
40: adapter unit
50: side rod unit

The invention claimed is:

1. A tool holder with straight spray of cooling water for connecting a tool to a machine tool and spraying cooling water, supplied from a cooling water supply unit, between the tool and a workpiece, the tool holder comprises:

a body that provides a mounting space in which the tool is mounted, wherein the body is rotationally drivable by the machine tool;

a housing unit that covers the outer surface of the body;

a cap nozzle unit that surrounds the outer circumferential surface of the tool, the cap nozzle unit is connected to a bottom end of the housing unit, and the cap nozzle unit is configured to spray the cooling water between the tool and the workpiece;

an adapter unit that is mounted on the machine tool, providing a passage for cooling water supplied from the cooling water supply unit, and the adapter unit determines a mounting position of the body to the machine tool; and a side rod unit, fixed to a side of the housing unit, is detachably connected to the adapter unit, and the side rod unit moves the cooling water supplied from the adapter unit to the cap nozzle unit, wherein the cap nozzle unit forms a retention space between the housing unit and the cap nozzle unit for collecting cooling water prior to discharge, and the cap nozzle unit is provided with a plurality of drain holes oriented parallel to a rotation axis of the tool, and the cooling water collected in the retention space is discharged through the plurality of drain holes while rotating in the same direction as the tool by receiving rotational force from the rotating tool in the retention space, wherein the centripetal force generated by the rotation of the cooling water in the retention space directs the discharged cooling water towards an end of the tool, wherein the side rod unit is disconnected from direct contact with the body when seated on the adapter unit, and directly connected to the body when removed from the adapter unit, wherein the coupling between the body and the housing unit is determined through the side rod unit, wherein when the side rod unit is connected to the adapter unit, the body is rotationally locked relative to the housing unit, preventing rotation of the body relative to the housing unit, and wherein, when the side rod unit is disconnected from the adapter unit, the body is released from the rotational lock with the housing unit, allowing the body to rotate relative to the housing unit, wherein the side rod unit comprises:

a receiving unit that forms a first receiving space having a first longitudinal axis defining a height direction and an opposite, downward direction, and a second receiving space, in communication with the first receiving space, having a second longitudinal axis extending in a first width direction perpendicular to the height direction and toward the housing unit;

a connection unit that slides along the receiving unit while being retained in the first receiving space and is detachably connected to the adapter unit;

an elastic unit that is received in the first receiving space, located on a bottom end of the connection unit, and the elastic unit is elastically deformed by an external force applied in the downward direction on the connection unit; and a subordinate unit that is linked to movement in either the height direction or the downward direction of the connection unit, the subordinate unit is received in the second receiving space and moves in the first width direction.

2. The tool holder with straight spray of cooling water of claim 1,
wherein the connection unit moves in the downward direction from a first position along the first receiving space to be located in a second position when connected to the adapter unit, and returns from the second position to the first position when disconnected from the adapter unit; and
wherein the elastic unit is compressed and elastically deformed as the connection unit moves from the first position to the second position, and when the connection unit is disconnected from the adapter unit, the elastic unit returns the connection unit from the second position to the first position by a restoring force due to compressive elastic deformation.

3. The tool holder with straight spray of cooling water of claim 1,
wherein the subordinate unit includes a through hole formed in the height direction, and the connection unit is configured to move in both the height direction and the downward direction along the through hole with the connection unit being inserted into the through hole.

4. The tool holder with straight spray of cooling water of claim 3,
wherein the connection unit has a guide hole penetrating in a second width direction that is perpendicular to the first width direction;
wherein, but the guide hole is inclined, from a bottom end of the guide hole to a top end of the guide hole in a direction, away from the housing unit;
wherein a side hole is formed on a side surface of the subordinate unit, and the subordinate unit has a sliding unit extending in the second width direction, the sliding unit being inserted into the side hole; and
wherein the sliding unit is inserted into the guide hole to slide along the guide hole as the connection unit moves in either the height direction or the downward direction.

5. The tool holder with straight spray of cooling water of claim 4,
wherein the body is rotationally locked relative to the housing unit when the subordinate unit is coupled with a coupling groove in the body, and the body is rotationally unlocked from the housing unit when the subordinate unit is spaced apart from the coupling groove.

6. The tool holder with straight spray of cooling water of claim 2,
wherein the connection unit has a first cooling hole and, via connection to the adapter unit, forms a first flow path through which the cooling water supplied from the adapter unit moves;
wherein the receiving unit has a second cooling hole forming a second flow path, and the first flow path is not in communication with the second flow path at the first position of the connection unit, but the first flow path is in communication with the second flow path at the second position of the connection unit; and
wherein the second flow path is in communication with a third flow path between the housing unit and the body part, and the third flow path is in communication with the retention space.

7. The tool holder with straight spray of cooling of claim 6,
wherein the third flow path comprises:
a first branch flow path and a second branch flow path and
an additional flow path that allows the cooling water to rotate and move through a helical part formed in a helical shape inside a bottom inner end of the housing unit,
wherein the additional flow path is in communication with the retention space.

8. The tool holder with straight spray of cooling of claim 1,
wherein the housing unit has a male thread formed on an outer peripheral surface of the bottom end; and
wherein the cap nozzle unit has a female thread formed in a shape corresponding to the male thread, the cap nozzle unit is removably connected to the housing unit.

9. The tool holder with straight spray of cooling of claim 1,
wherein the cap nozzle unit includes a tool insertion hole through which the tool passes and the plurality of drain holes are radially arranged around the tool insertion hole.

10. The tool holder with straight spray of cooling of claim 9,
wherein the plurality of drain holes includes a first group of drain holes disposed at a first distance from the tool insertion hole and a second group of drain holes disposed at a second distance greater than the first distance from the tool insertion hole, and
wherein an inclination angle of each drain hole in the second group of drain holes is greater than an inclination angle of each drain hole in the first group of drain holes.

11. The tool holder with straight spray of cooling of claim 10,
wherein the cooling water sprayed through the second group of drain holes minimizes scattering of the cooling water sprayed through the first group of drain holes due to the repulsive force caused by the rotational force of the tool.

* * * * *